United States Patent [19]
Elser et al.

[11] 4,171,407
[45] Oct. 16, 1979

[54] METHOD OF MAKING AQUEOUS EMULSIONS OF ACRYLATE COPOLYMERS IN THE PRESENCE OF A DEGRADED STARCH PROTECTIVE COLLOID

[75] Inventors: Wilhelm Elser, Graefenhausen; Klaus Huebner, Ober-Ramstadt-Eiche; Hans Ottofrickenstein, Darmstadt-Eberstadt; Hans Boessler, Darmstadt, all of Fed. Rep. of Germany

[73] Assignee: Rohm GmbH, Darmstadt, Fed. Rep. of Germany

[21] Appl. No.: 860,826

[22] Filed: Dec. 15, 1977

Related U.S. Application Data

[63] Continuation-in-part of Ser. No. 733,325, Oct. 18, 1976, Pat. No. 4,104,227.

[30] Foreign Application Priority Data

Dec. 28, 1976 [DE] Fed. Rep. of Germany ....... 2659133

[51] Int. Cl.² .................... B32B 27/06; C08L 3/02

[52] U.S. Cl. .................... 428/500; 260/17.4 GC; 260/17.4 ST; 526/910

[58] Field of Search .............. 260/17.4 GC, 17.4 ST; 526/910; 428/500

[56] References Cited

U.S. PATENT DOCUMENTS

| | | | |
|---|---|---|---|
| 2,354,210 | 7/1944 | Jacobson | 526/911 |
| 3,360,506 | 12/1967 | Benneville et al. | 526/263 |
| 3,513,120 | 5/1970 | Pohlemann et al. | 526/911 |
| 3,767,604 | 10/1973 | Hjermstad et al. | 260/17.4 ST |
| 3,769,248 | 10/1973 | Kovats | 260/17.4 ST |
| 3,770,672 | 11/1973 | Yoshizawa et al. | 260/17.4 ST |
| 4,079,025 | 3/1978 | Young et al. | 260/17.4 ST |

*Primary Examiner*—Edward M. Woodberry
*Attorney, Agent, or Firm*—Curtis, Morris & Safford

[57] ABSTRACT

Non-blocking coatings are disclosed, which coatings comprise an acrylate ester emulsion polymer prepared by polymerization in the presence of a degraded starch which, in a 10 percent solution in 1 N NaOH, has a viscosity not greater than 15 mPa·s at a velocity gradient $D = 532.1 \text{ s}^{-1}$.

5 Claims, No Drawings

METHOD OF MAKING AQUEOUS EMULSIONS OF ACRYLATE COPOLYMERS IN THE PRESENCE OF A DEGRADED STARCH PROTECTIVE COLLOID

This application is a continuation-in-part of copending application Ser. No. 733,325 filed October 18, 1976, Now U.S. Pat. No. 4,104,227 granted Aug. 1, 1978.

The present invention relates to a method for making non-blocking coatings, for example paints on wood, metal, or a similar substrate, finishing lacquers on artificial leather, or coatings on paper, by the application to such a substrate of an aqueous coating agent comprising an emulsion polymer of acrylate esters, and to said coating agents and emulsion polymers.

Synthetic resin dispersions which have been prepared by the emulsion polymerization of acrylate esters or mixtures thereof with other vinyl monomers are already common as coating agents or as binders in coatings of the aforementioned kind. Thanks to their content of acrylate esters, these dispersions are capable of film formation at room temperature or at slightly elevated temperatures. On the other hand, however, the films formed in this manner have the disadvantage that the coatings formed therefrom may become tacky at room temperature, but in every case become tacky at slightly elevated temperatures. This has the consequence that rolled-up trains of paper, synthetic resins, or metal sheets covered with coatings of this type stick together on storage, which phenomenon is designated as "blocking". The blocking point, that is the temperature at which the coatings become tacky, can of course be raised by using monomers such as styrene, acrylonitrile, or methyl methacrylate in preparing the emulsion polymer to impart hardness to the polymer. However, this measure simultaneously increases the minimum film-forming temperature (MFT), so that the dispersions do not dry to a clear coherent film at room temperature.

Thus, the problem is posed of increasing the temperature difference between the blocking point and the minimum-film forming temperature. In the present specification and claims, the blocking point is to be understood as the highest temperature at which two coating layers, each 30 microns thick and applied to paper, can be laid one upon the other for 60 minutes under a load of 50 g/cm$^2$ and can then subsequently again be separated without damage to the surface. The MFT is, according to DIN 53787, that limiting temperature above which a synthetic resin dispersion forms a crack-free film on drying under specified conditions.

The possibilities now known for increasing the temperature separation between the blocking point and the MFT are not satisfactory. Cross-linking of the synthetic resin subsequent to film formation can only be carried out if the film on the coated substrate can be heated to temperatures above 100° C., which is often not the case. Further, tackiness of the film is not completely overcome by cross-linking. Volatile plasticizers have also already been combined, prior to film formation, with dispersions of synthetic resins having a sufficiently high blocking point in order to decrease the MFT into the room-temperature region. This process cannot be used if the film is to be non-blocking already shortly after drying or if the coated objects are to be used in interior spaces in which the air would be contaminated by the evaporating plasticizer.

A method has now been found for the preparation of non-blocking coatings in which an aqueous agent is applied to the substrate to be coated, which agent contains a protective colloid and, as a coating material or bonding agent, an emulsion polymer having a minimum film-forming temperature not above 50° C. and which comprises at least 80 percent by weight of alkyl esters of acrylic acid, alone or in combination with alkyl methacrylates and/or styrene, of which at least 30 percent by weight are acrylate esters having 1 to 8 carbon atoms in the alkyl portion thereof.

The balance of up to 69.5 percent by weight of this component, to the extent it is not all an acrylate ester or esters having 1 to 8 carbon atoms in the alcohol portion, comprises acrylate esters of longer-chain alcohols, alkyl methacrylates, and/or styrene. The emulsion polymer further comprises from 0.5 to 5 percent by weight of an unsaturated polymerizable carboxylic acid, which may be present in the form of its salt. The emulsion polymer may also contain up to 19.5 percent by weight of further free-radically polymerizable monomers other than those already mentioned. According to the invention, an emulsion polymer is used which has been prepared in the presence of a protective colloid which is a degraded starch, the viscosity of which, in the form of a 10% solution in 1 N sodium hydroxide, does not exceed 15 mPa . s, measured at a velocity gradient of $D=532.1$ s$^{-1}$. The MFT of the emulsion polymer prepared in this manner is not different from that found in those emulsion polymers of similar composition which, instead of containing a protective colloid, exclusively contain low molecular weight surface active agents as emulsifiers. In contrast, however, the blocking point of films prepared according to the present invention is clearly increased.

The composition of the emulsion polymers to be employed according to the present invention corresponds with that usually found in dispersions for paints and coatings. Known acrylate dispersions of this type usually contain only low molecular weight surfactants of the anionic and non-anionic type as emulsifying agents. Fundamentally, it is also known to prepare dispersions having a content of protective colloids. Because of their disadvantageous influence on film properties, these additives are added in the smallest possible amounts. Nevertheless, to produce a large effect, for example, increases in viscosity, thixotropy, structural viscosity, and the like, as a rule the highest possible molecular weight protective colloids must be used. The protective colloids in these cases are added after the conclusion of polymerization. Common protective colloids are polyvinyl alcohol, polyvinyl pyrrolidone, polyacrylic acid salts, or cellulose ethers, for example. Natural products have also already been used as protective colloids, for example casein, alginates, dextrins, or starch which has been made water soluble by enzymatic or hydrolytic treatment. Paint dispersions comprising vinyl acetate have also been prepared in the presence of amylopectin. Amylopectin is a very high molecular weight, strongly-branched component of natural starch. Synthetic resin dispersions have also been prepared from vinyl esters in the presence of water-soluble starch derivatives. Branched water-soluble starch, such as amylopectin, is used together with dextrins.

The tendency to use natural products of this kind in such highly-sensitive systems as synthetic resin dispersions has declined in industrial practice to the degree that economical synthetic products became available with always-constant properties exactly tailored to technical requirements. If the use of protective colloids in acrylate dispersions today represents an exception, then the use of starch and starch derivatives in such dispersions can be viewed as completely unusual. This is true not only for the addition of protective colloids after polymerization is concluded, but also in a still-greater degree for the case in which protective colloids are added already during the polymerization. The high dispersibility desired in acrylate dispersions is generally lost when protective colloids are used and dispersions with coarse particles and having properties which are unsatisfactory for technical use are obtained. Everyone skilled in the art would view the use of starch or starch degradation products in the preparation of an acrylate dispersion as involving a long-superseded technology if these materials were employed to accomplish the technical ends for which protective colloids were earlier principally employed, namely for increasing storage stability or influencing viscosity. Today, more effective and reliable agents are available to those skilled in the art for reaching these goals.

The heart of the present invention involves the surprising recognition that certain specific starch degradation products have the property of clearly increasing the blocking point of films of acrylate dispersions without simultaneously increasing the MFT. However, this effect only occurs if the starch derivatives in question are present before or during the emulsion polymerization. If they are first added after the polymerization process is concluded, an increase in the blocking point does not occur. The surprising effect is, further, associated with certain viscosity properties in the starch derivatives. Namely, their viscosity must not exceed 15 mPa . s measured in the form of a 10% solution in 1 N sodium hydroxide at a velocity gradient $D=532.1$ s$^{-1}$.

The viscosity behavior in the velocity gradient is determined by the following method. The sample is introduced at 20° C. into the temperature-controlled measuring cylinder of the viscosimeter ("Rheomat 15") in the amount indicated by the manufacturer of the apparatus, taking care to exclude air bubbles. When the sample has reached a temperature of $20\pm0.2°$ C., the measurement can be begun. Three determinations are performed, each after refilling, at a velocity gradient $D=532.1$ s$^{-1}$ (velocity stage 14), and the average value is determined. Commercially available so-called "soluble starches" or the amylopectin obtained from natural starch do not meet the test requirements. Under the measurement conditions specified, in general viscosities are found for these degradation products which are of the order of magnitude of 25–50 mPa . s.

Starch degradation products having the designated viscosity behavior can be obtained by a controlled oxidative, enzymatic, or hydrolytic degradation of natural starch. Particularly advantageous degradation products are obtained, for example, by treating an aqueous starch suspension containing 36–39 percent of dry solids with sodium hypochlorite for several hours at 25°–30° C. and at a pH of 6.5–7 according to Ullmanns Enclopaedie der technischen Chemie, 3d Ed., Vol 16, page 343 (1965). Other degrading agents include hydrogen peroxide, persulfates, or sodium peroxide. Enzymatic degradation using amylases, or hydrolytic degradation with, for example, catalytic amounts of sulfuric acid, is suitably constantly monitored by measurement of the viscosity behavior in the velocity gradient and is carried out at least until the highest permissible viscosity limit is reached. To be sure, the degradation can be carried out to the state of higher dextrins, but starch degradation products having molecular weights between 20,000 and 100,000 represent the optimum. So-called maltodextrins or yellow dextrins are still suitable. Lower dextrins having molecular weights below 2,000 or having 12 or fewer glucose units are no longer suitable.

The amount of the starch derivative is chosen to be from 1 to 5 percent by weight of the monomers of the emulsion polymer to be prepared. A range of 2 to 4 percent by weight is preferred. Since the efficacy decreases somewhat with molecular weight, strongly degraded starch derivatives, such as dextrins, are used in larger amounts than somewhat higher molecular weight products. Amounts less than 1 percent by weight do not permit attainment of the desired increase in the blocking point, even when starch degradation products having viscosities in the upper range of those which are permissible are chosen. The attainable effect cannot be increased by increasing the amount added beyond the aforementioned limit of 5 percent. The increasing viscosity of the aqueous phase makes the preparation of the dispersion more difficult.

The increase in the blocking point achieved by the process of the invention generally is about 10 to 20 Centigrade degrees, so that the temperature interval between the MFT and the blocking point, which mostly is between 20° and 40°, is spread to from 30° to 50°. For example, a synthetic resin dispersion prepared from 49 parts of n-butyl acrylate, 50 parts of methyl methacrylate and 1 part of methacrylic acid has an MFT of 12° C. The blocking point of films prepared therefrom is 30° C. if the polymerization is carried out without the addition of protective colloids. Upon the addition of commercially-available soluble starch, the tendency toward coagulation of the dispersion increases even during the emulsion polymerization, which tendency, however, can be compensated by an increased addition of emulsifier. Nevertheless, also in this case, no change in the blocking point of films prepared from the dispersion is observed. In contrast, if an amount of 3 percent of degraded starch is added, the viscosity of which is 6.3 mPa . s under the conditions described more fully above, the blocking point of films prepared from such a dispersion is increased by 10°, i.e., to 40° C. In a corresponding fashion, if 3 percent of degraded starch is employed in the preparation of the dispersion, an increase in the blocking point to 50° C. is observed in dispersions which, because of an adjustment of the polymer to a somewhat harder condition, have an MFT of for example, 20° C. and otherwise form films having a blocking point of 40° C.

The manner by which the starch degradation products added according to the present invention act is not known. It is hypothesized that a part of the emulsion polymer is graft-polymerized on to the starch molecule. However, this hypothesis does not give any explanation for the observation that the blocking point increases while the MFT remains unchanged.

The dispersions to be used according to the present invention are preferably prepared solely from alkyl esters of acrylic acid or methacrylic acid and, optionally, styrene, as well as 1 to 5 percent by weight of an unsaturated polymerizable carboxylic acid. The minimum contents of alkyl esters of acrylic acid having 1 to 8 carbon atoms in the alkyl portion is 30 percent by weight of the polymer. Among these esters, ethyl acrylate and n-butyl acrylate have preferred technical significance. Examples of further usable acrylic esters are methyl-, n-propyl-, isopropyl-, and 2-ethylhexyl-acrylate. Also mixtures of the aforementioned acrylate esters with each other can be employed in synthesizing the dispersions. As a rule, the emulsion polymers also contain, in addition to the acrylic esters, alkyl esters of methacrylic acid, particularly methyl-, propyl-, n-butyl-, or isobutyl-methacrylate, or styrene. The ratio of the "soft" monomers, that is, the acrylic esters and higher methacrylic esters, to the "hard" co-monomers, which in addition to the lower methacrylic esters and styrene also include the unsaturated carboxylic acids and some of the monomers having functional groups described below, is so adjusted that the MFT does not exceed 50° C.

As unsaturated carboxylic acids which can be present in the emulsion polymer in amounts between 0.5 and 5 percent by weight, acrylic acid and methacrylic acid are of principal interest. Instead of the free acids, their water-soluble salts can also be employed, in particular the alkali metal salts. When salts are employed, the weight of the free acid is used in determining the amount to be added.

To the extent that still further co-monomers are involved in the preparation of the emulsion polymer in addition to the monomers described above, the maximum amount of such materials is from 15 to 19.5 percent by weight of the polymer. For example, co-monomers having particular functional groups can be employed, which co-monomers impart to the emulsion polmer properties which are desired for specific technical uses. Thus, for example, acrylonitrile of methacrylonitrile increase the hardness and toughness of the polymer films. Monomers containing hydroxy groups or amino groups, such as hydroxyethyl-, hydroxypropyl-, or hydroxybutyl- acrylate or -methacrylate, or dimethylaminoethylacrylate or - methacrylate improve the adhesion of the polymer film to various substrates. Emulsion polymers which include monomers containing imidazole or imidazoline groups have outstanding adhesion to fresh or weathered alkyd resin substrates. These emulsion polymers are the subject of copending parent patent application Ser. No. 733,325 filed Oct. 18, 1976, now U.S. Pat. No. 4,104,227 granted Aug. 1, 1978.

Even if the emulsion polymers to be employed according to the present invention in the preferred case do not contain any self-cross-linking groups, for example N-methylol-acrylamide or -methacrylamide, the methylol ethers thereof, or glycidylacrylate or -methacrylate, it is nevertheless possible to incorporate thereinto monomers having such groups. A clear increase in the blocking point is brought about by a cross-linking of films formed from such dispersions. Nevertheless, in particular cases it can be desired to increase the blocking point of a film even before the cross-linking reaction, for example, to inhibit the sticking to transport rolls of the coating present on a coated train.

The emulsion polymers as a rule contain the anion-active or cation-active emulsifying agents which are otherwise conventional in the usual amounts, which are between 0.1 and 4 percent by weight of the water phase. Conventional emulsifying agents of this type are the alkali metal soaps, salts of sulfated fatty alcohols or their oxethylation products, sulfated oxethylated alkyphenols, or salts of fatty amines and of their substitution products. It has proved that non-ionic emulsifiers, which as a rule are present in considerable amounts in paint dispersions, partially or completely counteract the effect of increasing the blocking point which is achieved by the process of the invention. Thus, it is preferred to avoid adding non-ionic surfactant-like emulsifying agents.

Otherwise, the preparation of the emulsion polymers to be used according to the present invention follows the techniques usually used. As polymerization initiators, potassium- or ammonium-persulfate, water-soluble azo-compounds such as the sodium salt of azo-bis-cyanovalerianic acid, or redox systems such as hydrogen peroxide in combination with iron salts can be used. The polymerization temperature depends on the decomposition temperature of the initiator and as a rule lies between 50° C. and 80° C. Toward the end of the polymerization, the temperature can be increased somewhat.

It is suitable to dissolve the starch degradation product in the aqueous phase before polymerization has begun. The monomers and the remaining components can be converted into a uniform emulsion prior to initiation of polymerization and the polymerization can be initiated by heating. Preferably, the monomers per se or in the form of an aqueous emulsion are gradually flowed into the reaction vessel during the polymerization process. In the last-mentioned case, a portion of the emulsifier, of the initiator, and of the starch degradation product to be used according to the present invention can be contained in the monomer emulsion which is added. The relationship of the total amount of water phase employed to the monomer phase is suitably so chosen that dispersions having a solids content of from 40 to 60 percent by weight are formed. The viscosity of the dispersions so obtained depends on different factors, among which the particle size, which may be in the region from 0.05 to 1 micron for example, has the strongest influence. Because of the addition of the starch degradation product, the viscosities of the dispersions so obtained are somewhat higher than those of comparable dispersions which are prepared without the addition of starch.

The composition of the dispersions can be extensively adapted to an intended end use. For the preparation of paints, particularly those to be used exteriorly, dispersions having a low MFT, for example from 0° C. to 5° C., are preferred. The blocking point of coatings prepared with such dispersions is clearly above the usual room temperature, whereas known dispersions of a comparable low MFT give films which are tacky already at room temperature. For the preparation of clear finishing lacquers for artificial leather and the like, dispersons having an MFT of 40° C. to 50° C. can be employed if the coating is dried in a warm-air tunnel. The sensitivity of the coating to temporary warming, for example, on irradiation with sunlight, is clearly decreased by the use of dispersions prepared according to the present invention.

According to the process of the invention, pigmented or unpigmented coatings can be applied to the most-varied substrates, for example, to metals, synthetic resins, papers, artificial leather, composition board, asbestos cement, raw wood, or to wood which has already been painted, for example which has an old coat of alkyd or oil paint thereon.

Preferably, pigmented paints are prepared for raw or treated wood substrates, for example to wooden frames, doors or windows. The paints are characterized by good flow, by more or less high gloss, and by good resistance to blocking. The pigment:binder ratio, depending on the gloss desired, is approximately from 1:2 to 1:1. Conventional pigments such titanium dioxide, chrome yellow, iron oxide pigments, phthalocyanine blue, and the like, are employed, optionally together with fillers such as chalk or silicated products. In addition, film-forming auxiliaries, dispersing auxiliaries, wetting agents, thickening agents, and other auxiliaries can be added in known fashion. The coating agent can be applied to the substrate to be coated by all usual means such as painting, spraying, dipping, rolling, or pouring to form a dry layer thickness of, for example, 20–100 microns. The coatings can be dried at room temperature or elevated temperature.

A better understanding of the present invention and of its many advantages will be had by referring to the following specific examples, given by way of illustration.

EXAMPLE 1

Three parts by weight of starch according to Zulkowsky [Chem. Ber. 23, 3295 (1891)] having a viscosity $\eta = 4.8$ mPa . s at a velocity gradient $D = 532.1$ s$^{-1}$ when in the form of a 10% solution in 1 N NaOH, are dissolved, together with 0.06 part by weight of the sodium salt of a sulfated addition product formed between tri-isobutylphenol and 7 mols of ethylene oxide, in 62.5 parts by weight of water in a polymerization apparatus equipped with a stirrer, reflux condenser and thermometer. The mixture is then heated to 80° C. and combined with 0.02 part by weight of amonium peroxydisulfate. Subsequently an emulsion comprising 94 parts by weight of water, 49.5 parts by weight of methylmethacrylate, 49.5 parts by weight of n-butylacrylate, 1 part by weight of methacrylic acid, 1.44 parts by weight of the sodium salt of the sulfated addition product formed between tri-isobutylphenol and 7 mols of ethylene oxide, and 0.18 part by weight of ammonium peroxydisulfate are added over four hours. When the addition is ended, the batch is kept for a further two hours at 80° C. and is then cooled to room temperature. A coagulate-free dispersion having a solids content of about 40 percent is obtained. The MFT of the dispersion is 12° C.

A paint is prepared from:
97 parts by weight of the aforementioned 40% dispersion
13.0 parts by weight of titanium dioxide
5.2 parts by weight of a thickening agent (cellulose ether, 2% in water)
0.1 part by weight of a defoaming agent comprising mineral oil
0.3 part by weight of a dispersing auxiliary ("Rohagit S L 252")
1.0 part by weight of a film-forming auxiliary (butylglycol acetate)

For determining the blocking point, a weakly-absorbent paper is coated with the paint using a 200 micron hand coater and is dried for eight hours at 23° C. and 45% relative humidity. Strips 2.5 cm. wide × 17 cm. long are cut from the paper, folded in the middle so that the coated sides lie next to each other, and are then loaded for one hour at 50 g/cm$^2$ at various temperatures. The coatings can be separated again without damage to the surface up to a storage temperature of 40° C. This temperature is designated as the blocking point.

EXAMPLE 1a

Comparison Example

Example 1 is repeated, but with the difference that the starch, in the form of a 10% solution, is first added after polymerization is concluded. The amount of water required for the preparation of the starch solution is taken into consideration in preparing the emulsion. As in Example 1, a coagulate-free dispersion with about 40 percent solids content and an MFT of 12° C. is obtained. The blocking point of the paint is decreased by about 10 Centigrade degrees as compared with Example 1, and is about 30° C.

EXAMPLE 1b

Comparison Example

Instead of the starch according to Zulkowsky which is used in Example 1, commercially available Hoffman-Starch HO 125 is used ($\eta = 29.2$ mPa . s, $D = 532.1$ s$^{-1}$, 10% in 1 N NaOH). The batch coagulates during polymerization.

EXAMPLE 2

An emulsion comprising 48.5 parts by weight of methyl methacrylate, 48.5 parts by weight of n-butyl acrylate, 3 parts by weight of methacrylic acid, 1.44 parts by weight of the sodium salt of a sulfated addition product formed between tri-isobutylphenol and 7 mols of ethylene oxide, 0.18 part by weight of ammonium peroxydisulfate, and 63 parts by weight of water is added over a period of four hours to a solution, heated to 80° C. and combined with 0.02 part by weight of ammonium peroxydisulfate, comprising 3 parts by weight of dextrin, 0.06 part of the aforementioned tri-isobutylphenol addition product, and 42 parts by water. The dextrin has a viscosity, $\eta = 4.9$ mPa . s, $D = 532.1$ s$^{-1}$, 10% in 1 N NaOH.

After the addition is concluded, the batch is kept for another two hours at 80° C. for post-polymerization and thereafter is cooled to room temperature. The dispersion so obtained is free of coagulate and has a solids content of about 50 percent. The MFT of the dispersion is 13° C.

As in Example 1a, a paint is prepared and the blocking point is determined. It lies at 50° C.

EXAMPLE 3

Three parts by weight of a commercially-available starch (Hoffman-Starch HO 125) are infused wth 27 parts by weight of water, heated with stirring to 80° C., and combined with 0.3 parts by weight of sodium peroxide. After a reaction time of 1–2 hours a clear solution is obtained having a viscosity of 9.6 mPa . s, $D = 532.1$ s$^{-1}$, after adjustment with 1 N NaOH. The degraded starch solution is now diluted with 35.5 parts by weight of water, neutralized with 1 N HCl, and combined with 0.06 part by weight of the sodium salt of a sulfated addition product formed between tri-isobutylphenol and 7 mols of ethylene oxide. The mixture is again heated to 80° C., 0.02 part by weight of ammonium peroxydisulfate is added and over a period of four hours an emulsion comprising 94 parts by weight of water, 48.5 parts by weight of methyl methacrylate, 48.5 parts by weight of n-butyl acrylate, 3 parts by weight of sodium methacrylate, 1.44 parts by weight of the aforementioned ethylene oxide addition product, and 0.18 part by weight of ammonium peroxydisulfate is flowed into the mixture. For post polymerization, the batch is kept for an additional two hours at 80° C. A coagulate-free dispersion having a solids content of about 40 percent is obtained. The MFT of the dispersion is 13° C.

As in Example 1, a paint is prepared and the blocking point determined. It lies at 60° C.

What is claimed is:

1. The method of making an aqueous emulsion polymer having a minimum film-forming temperature below 50° C. and adaptable to use as a binder in coating agents forming non-blocking coatings, which method comprises emulsion polymerizing a monomer mixture comprising (A) 80 to 95.5 percent by weight of at least one acrylic acid alkyl ester, alone or in combination with a member selected from the group consisting of methacrylic acid alkyl esters and styrene, of which at least 30 percent by weight is an acrylic acid alkyl ester having 1 to 8 carbon atoms in the alkyl portion; (B) 0.5 to 5 percent by weight of an unsaturated polymerizable carboxylic acid or of a salt thereof; and (C) 0 to 19.5 percent by weight of other free-radically polymerizable monomers, in the presence of 1 to 5 percent, by weight of said monomers, of a protective colloid which is a degraded starch having a viscosity, in the form of a 10% solution in 1 N sodium hydroxide, of less than 15 mPa . s at a velocity gradient $D=532.1$ s$^{-1}$.

2. A method as in claim 1 wherein said polymerization proceeds in the presence of an anionic or cationic emulsifier and in the absence of non-ionic emulsifiers or surface-active agents.

3. An aqueous emulsion polymer prepared by the method of claim 1.

4. In a coating agent comprising a film-forming aqueous emulsion polymer in combination with conventional pigments and coating auxiliaries, the improvement wherein said film forming aqueous emulsion polymer is that according to claim 3.

5. The method of forming a non-blocking coating on a substrate which comprises applying thereto a coating agent comprising, as its binder component, a film-forming aqueous emulsion polymer as in claim 3.

* * * * *